(12) United States Patent
Beaucamp et al.

(10) Patent No.: US 10,493,597 B2
(45) Date of Patent: Dec. 3, 2019

(54) METHOD FOR SHAPING A WORKPIECE

(71) Applicant: Zeeko Limited, Coalville (GB)

(72) Inventors: Anthony Tadeus Beaucamp, Saitama (JP); Phillip Charlton, Saitama (JP); David Douglas Walker, North Wales (GB)

(73) Assignee: Zeeko Limited, Coalville (GB)

( * ) Notice: Subject to any disclaimer, the term of this patent is extended or adjusted under 35 U.S.C. 154(b) by 199 days.

(21) Appl. No.: 15/515,608

(22) PCT Filed: Oct. 3, 2014

(86) PCT No.: PCT/GB2014/000392
§ 371 (c)(1),
(2) Date: Mar. 30, 2017

(87) PCT Pub. No.: WO2016/051121
PCT Pub. Date: Apr. 7, 2016

(65) Prior Publication Data
US 2017/0246728 A1      Aug. 31, 2017

(51) Int. Cl.
*B24D 13/14*      (2006.01)
*B24B 19/26*      (2006.01)
(Continued)

(52) U.S. Cl.
CPC ............ *B24D 13/142* (2013.01); *B24B 19/26* (2013.01); *B24B 53/06* (2013.01); *C03B 23/03* (2013.01); *C03B 2215/46* (2013.01)

(58) Field of Classification Search
CPC ....... B24D 13/142; B24B 11/00; B24B 19/26; B24B 53/06; B24B 53/04; C03B 23/03; C03B 2215/46
(Continued)

(56) References Cited

U.S. PATENT DOCUMENTS 2,164,418 A        7/1939   Monnet et al.
2,402,455 A *      6/1946   Seyferth ................. B24B 53/04
                                                          125/11.17
(Continued)

FOREIGN PATENT DOCUMENTS

CN          1335799 A      2/2002
CN        102173568 A      9/2011
(Continued)

OTHER PUBLICATIONS

Patent Cooperation Treaty, "International Search Report from PCT Applicaiton No. PCT/GB2014/000392, dated Oct. 12, 2015", Oct. 12, 2015, pp. 1-8.
(Continued)

*Primary Examiner* — George B Nguyen
(74) *Attorney, Agent, or Firm* — Fogg & Powers LLC

(57) ABSTRACT

There is described a method, apparatus and shaping tool for shaping a workpiece. The tool comprises a flexible support surface on which are mounted a number of rigid pellets (84) carrying abrasive material. The tool is driven, in contact with the workpiece surface (S), to perform a ductile grinding operation which results in a finished surface of reduced roughness as compared to conventional grinding operations, while achieving significantly higher material removal rates than comparable ultra-precision grinding techniques. A procedure for preparing the tool for operation by conditioning the tool against a conditioning surface is also described. An exemplary application for the method and apparatus is in the preparation of moulds for moulding curved glass components for use in display screens, in which process a silicon carbide mould cavity surface is shaped using the method to produce a mould cavity surface with a smooth surface finish.

30 Claims, 8 Drawing Sheets

(51) Int. Cl.
*B24B 53/06* (2006.01)
*C03B 23/03* (2006.01)

(58) Field of Classification Search
USPC .......................................... 451/159, 56, 495
See application file for complete search history.

(56) References Cited

U.S. PATENT DOCUMENTS

| | | | | |
|---|---|---|---|---|
| 2,444,760 | A * | 7/1948 | Tambini | B24D 13/142 |
| | | | | 451/505 |
| 3,517,466 | A | 6/1970 | Bouvier | |
| 3,910,159 | A * | 10/1975 | Gladwin | B23C 3/13 |
| | | | | 409/199 |
| 5,045,161 | A * | 9/1991 | McGregor | B23H 3/10 |
| | | | | 204/212 |
| 5,895,311 | A * | 4/1999 | Shiotani | B23H 1/00 |
| | | | | 451/11 |
| 6,217,433 | B1 | 4/2001 | Herrman et al. | |
| 6,227,952 | B1 * | 5/2001 | Diehl | B24B 11/00 |
| | | | | 451/140 |
| 8,118,642 | B2 * | 2/2012 | Coulon | B24B 1/00 |
| | | | | 451/123 |
| 8,210,909 | B2 * | 7/2012 | Bernardi | B24B 9/00 |
| | | | | 451/356 |
| 8,348,717 | B2 * | 1/2013 | Silva | B24B 13/01 |
| | | | | 451/42 |
| 8,360,824 | B2 * | 1/2013 | Harada | B24B 7/241 |
| | | | | 451/11 |
| 2001/0024934 | A1 * | 9/2001 | Ohmori | B24B 13/06 |
| | | | | 451/56 |
| 2007/0021041 | A1 * | 1/2007 | Muranishi | B24B 7/17 |
| | | | | 451/56 |
| 2014/0113525 | A1 * | 4/2014 | Chan | G05B 19/19 |
| | | | | 451/5 |

FOREIGN PATENT DOCUMENTS

| | | | | |
|---|---|---|---|---|
| EP | 0754524 | A1 * | 1/1997 | ............ B24B 9/146 |
| EP | 1369201 | | 12/2003 | |
| EP | 1616666 | A1 | 1/2006 | |
| EP | 1754569 | A1 * | 2/2007 | ............ B24B 1/04 |
| GB | 2452091 | | 2/2009 | |

OTHER PUBLICATIONS

Beaucamp et al., "Shape adaptive grinding of CVD silicon carbide", "SciVerse ScienceDirect", Apr. 5, 2014, pp. 1-4, Publisher: CIRP Annals Manufacturing Technology.

Beaucamp et al., "Process mechanism in shape adaptive grinding (SAG)", "CIRP Annals Manufacturing Technology", Apr. 28, 2015, pp. 1-4, Publisher: SciVerse ScienceDirect.

* cited by examiner

METHOD FOR SHAPING A WORKPIECE

CROSS-REFERENCE TO RELATED APPLICATIONS

This application is a 371 US National Stage Application of International Patent Application No. PCT/GB2014/00392, titled "METHOD FOR SHAPING A WORKPIECE" filed on Oct. 3, 2014.

FIELD OF THE INVENTION

The present invention relates to the shaping and surface finishing of workpieces, and is particularly concerned with a shaping apparatus and process which can achieve high removal rates of material from a workpiece surface so as to shape the workpiece accurately to the required form, while leaving the shaped workpiece surface with a high degree of smoothness.

Workpieces shaped using the method of the invention may be used as moulding dies for the production of moulded parts requiring a highly smooth surface finish, for example for moulding curved glass screens for consumer products such as mobile telephones, wearable technology such as watches, and tablet and computer screens. The method may also be used for shaping and finishing metallic components, such as jet engine turbine blades.

PRIOR ART

Rigid grinding wheels, or flexible sheet materials impregnated or coated with abrasive particles have hitherto been used for grinding workpieces to achieve a desired final shape for the workpiece. The grinding wheel may be rotated and brought into contact with the workpiece, moving the grinding wheel over the surface of the workpiece to remove the material and achieve the required shape. In lapping processes flexible abrasive sheets are secured to a rigid plate and moved over the surface of the workpiece. Alternatively in belt grinding processes the workpiece is pressed against a run of the flexible belt moving between two pulleys. Pressure of the abrasive particles against the workpiece removes material from the workpiece to bring the workpiece to the required shape. However, although such prior art grinding processes are effective in rapidly removing material from the workpiece, they leave the treated area of the workpiece with a rough surface which requires subsequent polishing if a smooth surface finish is required. Furthermore, in the technologies discussed above the grinding ratio, which is a measurement of the wear rate of the workpiece compared to the wear rate of the grinding tool, tends to have a low value, leading to poor accuracy in shaping the workpiece and

BRIEF SUMMARY OF THE INVENTION

The present invention seeks to provide a shaping technique which combines both relatively high rates of removal of material from the workpiece so that the form of the workpiece may be rapidly finalised, yet leaves the workpiece with a smooth surface finish which requires no further treatment. The process will be referred to below as Shape Adaptive Grinding (SAG).

The shaping technique of the present invention combines the shape adaptivity of a flexible tool to conform to the shape of a free-form surface on the macro scale with the provision of substantially rigid grinding elements on the microscale which can effect rapid material removal yet leave a highly finished surface One aspect of the present invention provides a machine for shaping a workpiece, the machine including a tool having a flexible support surface with a plurality of rigid pellets mounted to the flexible support surface and carrying abrasive material, each pellet having a surface facing away from the flexible support surface, the said surfaces of the rigid pellets forming a working surface of the tool, and a mount onto which said flexible support surface is mounted, actuator means for moving said tool relative to said surface of said workpiece; and control means for automatically controlling said actuator means to form an area of contact between the working surface of the tool and the surface of said workpiece, and to move said area of contact across the surface of said workpiece.

A second aspect of the present invention provides a tool for a shaping machine, the tool comprising a flexible working surface having a plurality of substantially rigid pellets attached thereto, and having abrasive material embedded in the rigid pellets.

A third aspect of the present invention provides a method of shaping a workpiece using the tool to perform a ductile-mode grinding operation, and a workpiece produced by the method.

A fourth aspect of the present invention provides a method of shaping and finishing a mould cavity component, and a mould cavity component produced by the method A fifth aspect of the present invention provides a method of producing a curved glass component using a mould prepared with the tool, machine and method of the invention.

A sixth aspect of the invention provides a method of producing a lens or a curved display screen using a mould prepared with the tool, machine and method of the invention.

Embodiments of the invention will now be described with reference to the accompanying drawings, in which:

SAG MACHINE STRUCTURE

Figure 1:
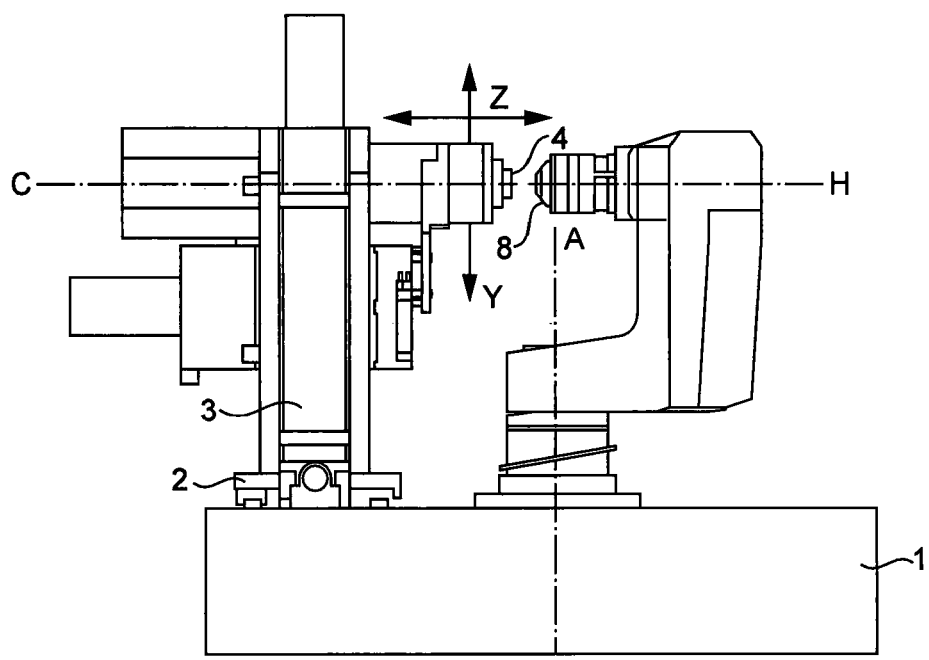
FIGS. 1 to 4 are left side, front, right side and top views, respectively, of a shaping machine having a shaping tool according to the present invention.
Figure 2:
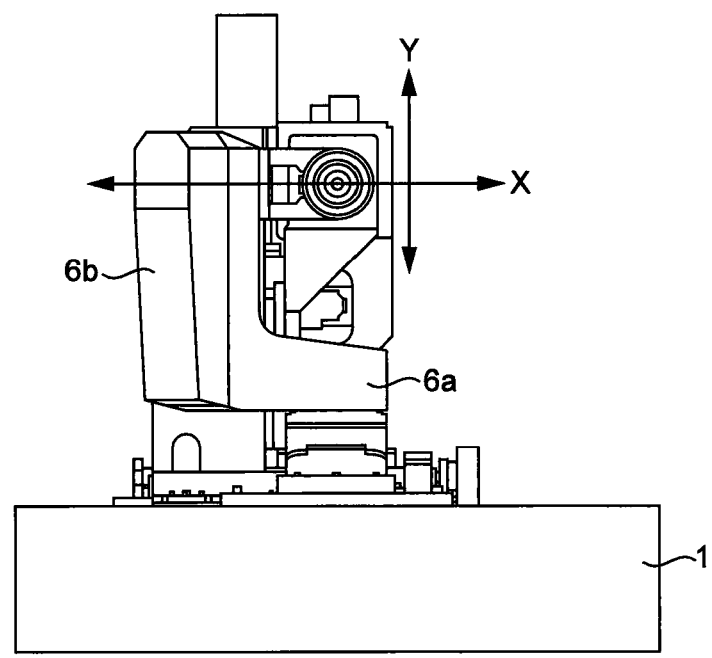
Figure 3:
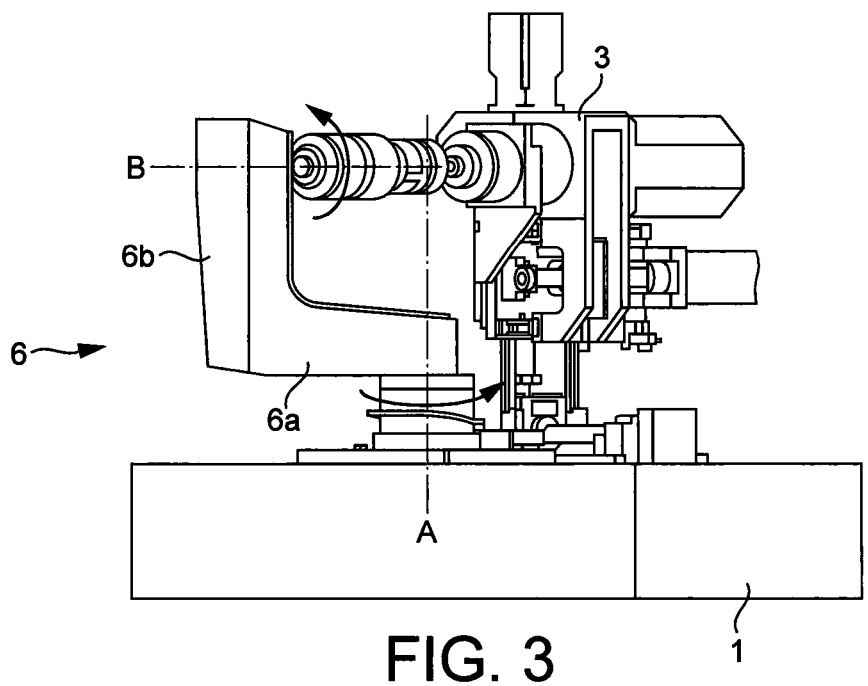

The polishing machine comprises a robust table 1 resistant to vibrations. On the table 1 there is mounted an X-slide mechanism 2 for movement in the x direction. On the X-slide mechanism 2 there is mounted a Y-slide mechanism 3 for movement in the y direction. On the Y-slide mechanism 3 there is mounted a turntable 4 for rotation about the axis labelled c. The turntable 4 is mounted on the Y-slide mechanism 3 via a z movement mechanism (not shown) for movement of the turntable 4 in the z direction. The turntable 4 has a holding surface onto which a workpiece 5 may be mounted for shaping and/or finishing. This arrangement provides for motion of the workpiece 5 in four axes, namely linear movement in the x, y and z directions, and rotation about the c axis. It will be appreciated that in the arrangement shown, the rotation axis c is parallel to the movement axis z.

Also mounted to the table 1 is a tool support arm 6 which is generally "L" shaped, having a generally horizontal base part 6a and a generally vertical upright 6b. The tool support arm is mounted to the table 1 at the end of the base part 6a remote from the upright 6b for rotation about a vertical axis A. At the upper end of the upright 6b a tool holder 7 is mounted to the upright, so as to be rotatable relative to the upright about horizontal axis B. In the tool holder 7, a rotary tool 8 is mounted for rotation relative to the tool holder, about an axis H which is set at an angle to the axis B about which the tool holder 7 rotates relative to the upright 6b.

The rotary tool 8 has a part-spherical working surface, which is arranged so that the rotation axes A, B and H coincide at the centre of the part-spherical surface. The arrangement is such that rotation of the tool arm 6 about the axis A rotates the part-spherical surface without moving the tool in translation, and rotation of the tool holder 7 about the axis H likewise does not move the tool in translation but merely alters the plane of the precession angle between the tool rotation axis B and the tool holder axis H.

Figure 4:
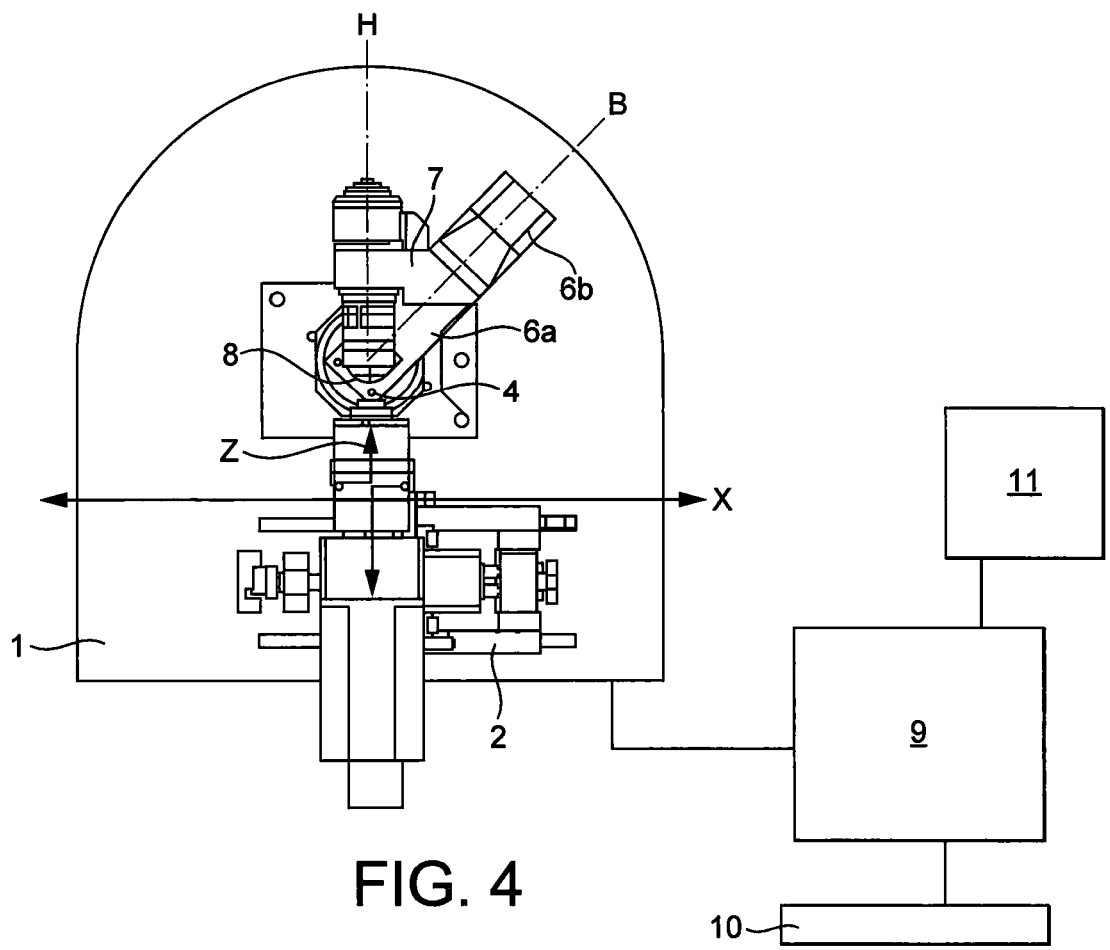

Control of the movement of the workpiece in the x, y and z directions and rotation about the c axis, and control of the rotations of the tool arm 6, the tool holder 7 and the tool 8 are affected by actuators and drives controlled by a processor apparatus 9, schematically illustrated in FIG. 4. The processor apparatus 9 may include input means 10 such as a keyboard, a port for external input signals or a disk drive, to receive process parameters and control instructions for controlling the motions of the workpiece and the tool. A display means 11 may be provided to display information to the machine operator.

By controlling the motions of the workpiece and the tool, the tool 8 may be positioned in contact with any part of the workpiece, and by controlling the rotation of the tool holder 7 about the axis H, the relative direction of movement of the tool relative to the workpiece at the area of contact between the tool and the workpiece may be selected. The movement of individual pellets across the workpiece surface within the area of contact is controlled by varying the precession angle, which is the angle between a normal to the workpiece surface at the area of contact and the axis about which the tool is rotated. If the tool rotation axis is held normal to the workpiece surface, individual pellets describe circular movements within the area of contact. As the precession angle increases, the individual pellets describe increasingly linear paths across the area of contact between the tool and the workpiece surface.

The part-spherical surface of the tool 8 is flexible and elastic, so that the area of contact between the tool and the workpiece may be increased by bringing the workpiece closer to the centre of the part-spherical tool surface, and decreased by moving the workpiece and the tool apart. The area of contact between the tool and the workpiece will be generally circular for a flat workpiece surface, but may deviate from a circular shape if the surface of the workpiece is curved.

While the example embodiment described above is a machine having seven axes of control, it will be appreciated that fewer control axes may be used to carry out the shaping and finishing process without departing from the invention.

Tool Structure

Figure 5A:
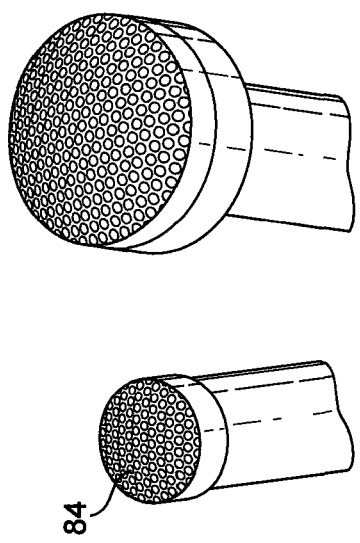
FIGS. 5a and 5b are photographs illustrating different shaping tools according to the present invention.
Figure 5B:
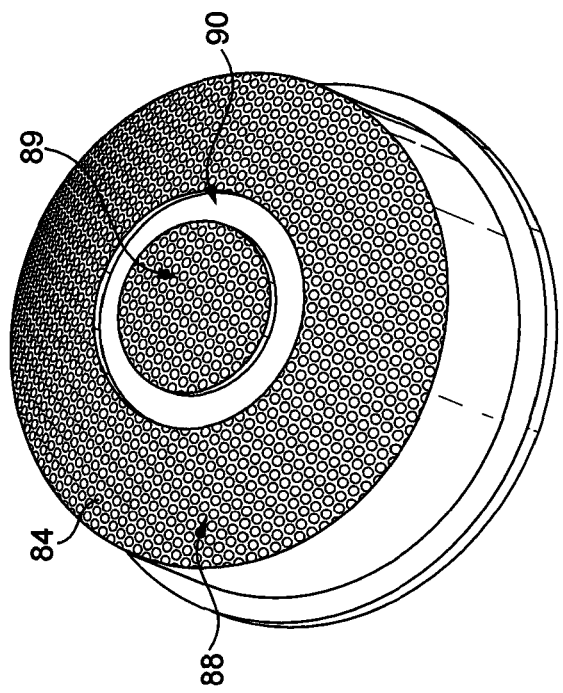
Figure 5:
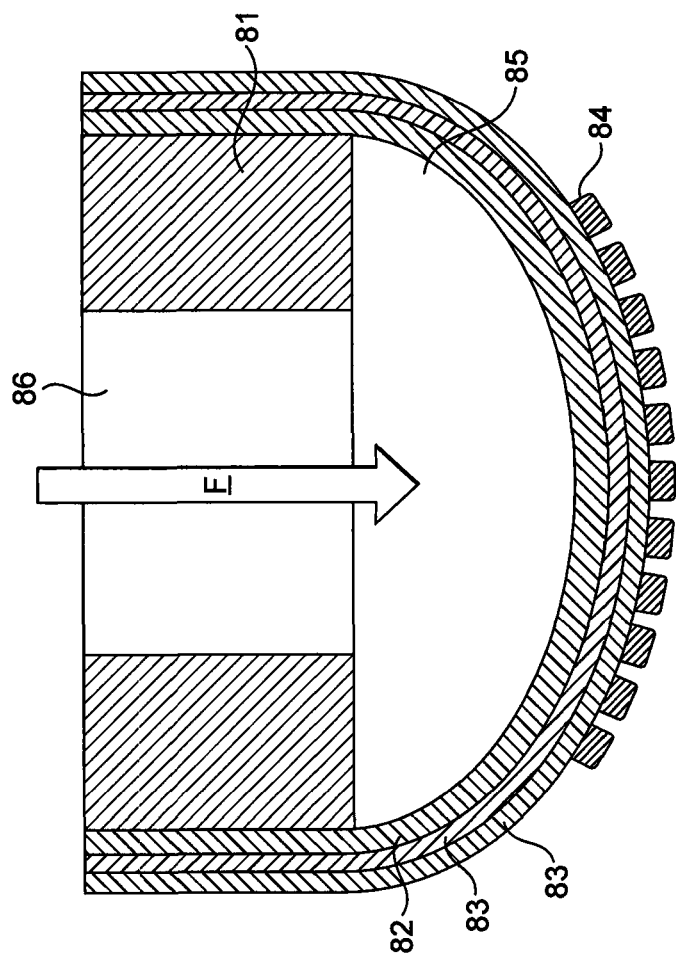
FIG. 5 is a schematic diametral sectional view of the shaping tool shown in FIGS. 1 to 4.
Figure 6:
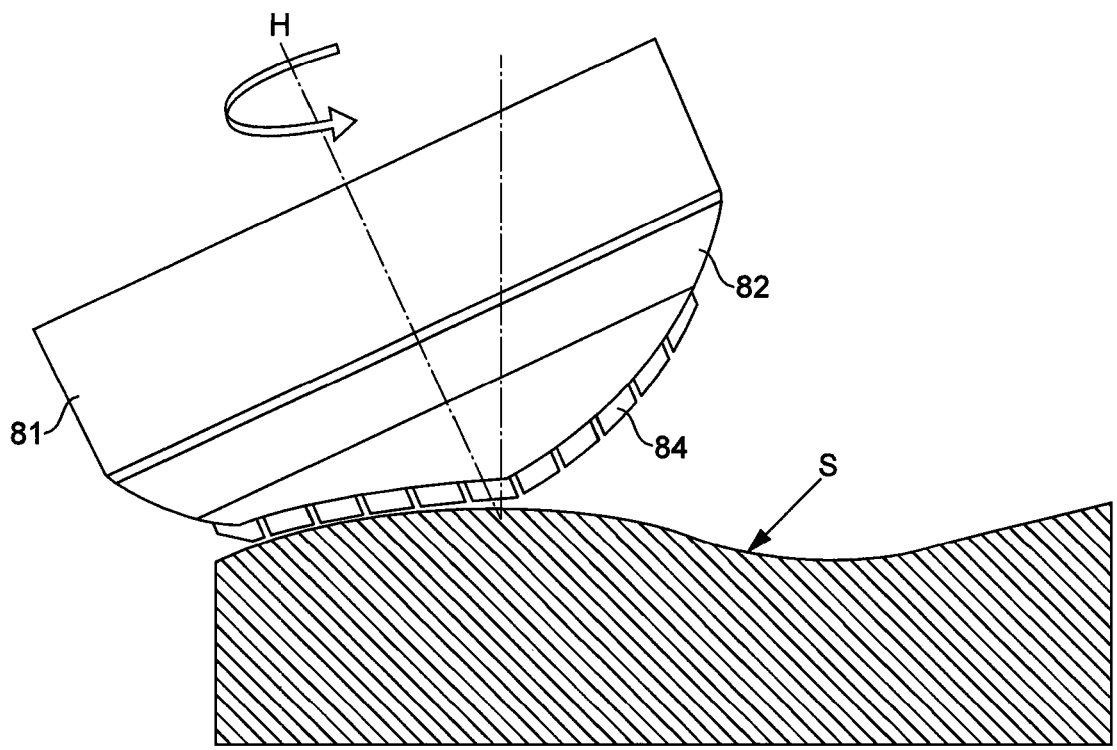
FIG. 6 is a schematic side view showing the shaping tool in operation, in contact with a curved workpiece surface.

FIGS. 5 and 6 illustrate the structure and operation of the shaping tool 8.

Referring now to FIG. 5, which is a diametral sectional view of the shaping tool, the tool comprises a body 81 of generally annular form. Attached to the body is a cup-shaped membrane 82, which is formed from flexible resilient material such as rubber. In the preferred embodiment, this cup-shaped membrane 82 comprises an inner rubber layer and an outer rubber layer, with a layer of reinforcing cloth sandwiched between the inner and outer rubber layers. The reinforcing cloth may comprise Kevlar® or other reinforcing material. The purpose of the reinforcing cloth layer is to prevent the rubber material from bulging under pressure. The overall diameter of the body 81 may be from 5 to 40 mm for most shaping operations. Larger or smaller diameter tools are, of course, possible.

To ensure an accurate part-spherical surface form of the tool, the outer surface of the cup-shaped membrane 82 is preferably dressed, using a grinding wheel or the like, when the cup-shaped membrane 82 is mounted to the tool spindle. The remainder of the tool is then assembled on the cup-shaped membrane 82.

Attached to the outer surface of the rubber membrane 82 is a fabric layer 83. The fabric layer 83 may be made from textile fabric, and may have metallic threads interwoven with, or otherwise incorporated into, the textile fabric. The textile fabric may be composed entirely of metallic threads. The fabric layer may, in some embodiments, be made from a non-woven fabric.

Attached to this fabric layer 83 is a pattern of rigid pellets 84, to which an abrasive material is bound. The abrasive material may be attached to the surface of the pellets, or the pellet material may form a matrix in which the abrasive material is embedded. The distribution of the abrasive particles within the pellets may be controlled so as to be uniform throughout the extent and depth of the pellets. Alternatively, the abrasive particles may be concentrated at particular regions of the pellets such as at the surface region which will form the working surface of the tool. It is further foreseen that the abrasive grains may be placed in a pattern which gives rise to a desirable surface finish of the workpiece, such as to produce grinding marks of a particular direction and depth, or to produce minimal grinding marks on the surface. The abrasive grains might, for example, be aligned in rows parallel to the direction of travel of the tool over the workpiece, i.e. aligned along "lines of latitude" of a spherical tool surface relative to the tool rotation axis. The abrasive grains might alternatively be aligned in rows set obliquely or perpendicularly to the "lines of latitude" of the working surface.

The pellets may be formed from metal such as nickel by electroplating them onto a fabric which includes metallic threads.

Alternatively, the pellets may be hard resin material such as epoxy resin, applied to the fabric material and cured to form a pattern of individual pellets each adhered to the fabric layer. Preferably the resin, when cured, has a hardness of above 80 on the Shore A scale. Further alternative materials for the pellets are polyurethane, optical pitch and Teflon®.

The size and shape of the pellets 84, and the spacing between adjacent pellets, may vary depending on the overall diameter of the tool 8. In the examples illustrated in FIG. 5*a* the tool on the left has an overall diameter of approximately 5 millimetres while the tool on the right has an overall diameter of approximately 10 millimetres. The pellets are generally circular in form, and are arranged over the working surface of the tool in a generally close-packed hexagonal array. In the example shown in FIG. 5*c*, the diameter of each pellet 84 is approximately 0.5 mm, and the centres of adjacent pellets are arranged approximately 0.75 mm apart so as to leave a gap of about 0.25 mm between adjacent pellets. The pellets may be of different shapes, such as rectangular, hexagonal, triangular, and may be arranged in different patterns over the working surface of the tool. The pellets on a tool surface may be of several different shapes, and may be arranged in annular regions where each region contains pellets of one or more particular shape.

Figure 5C:
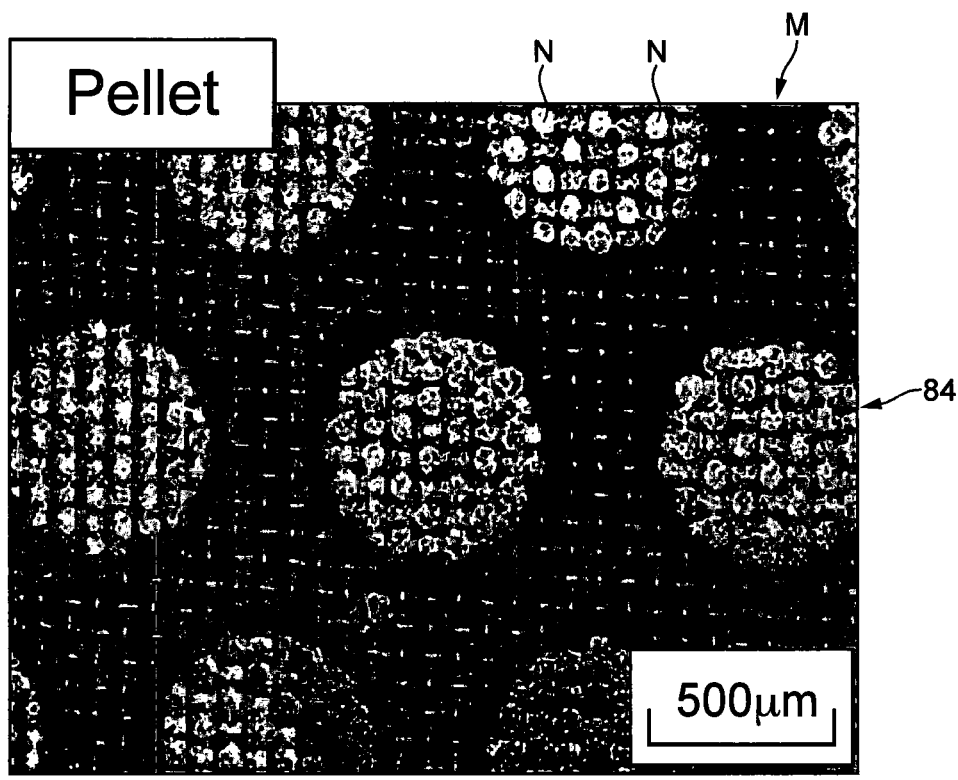
FIG. 5c is a magnified view of the working surface of the larger tool shown in FIG. 5a, showing the individual pellets.
Figure 5D:
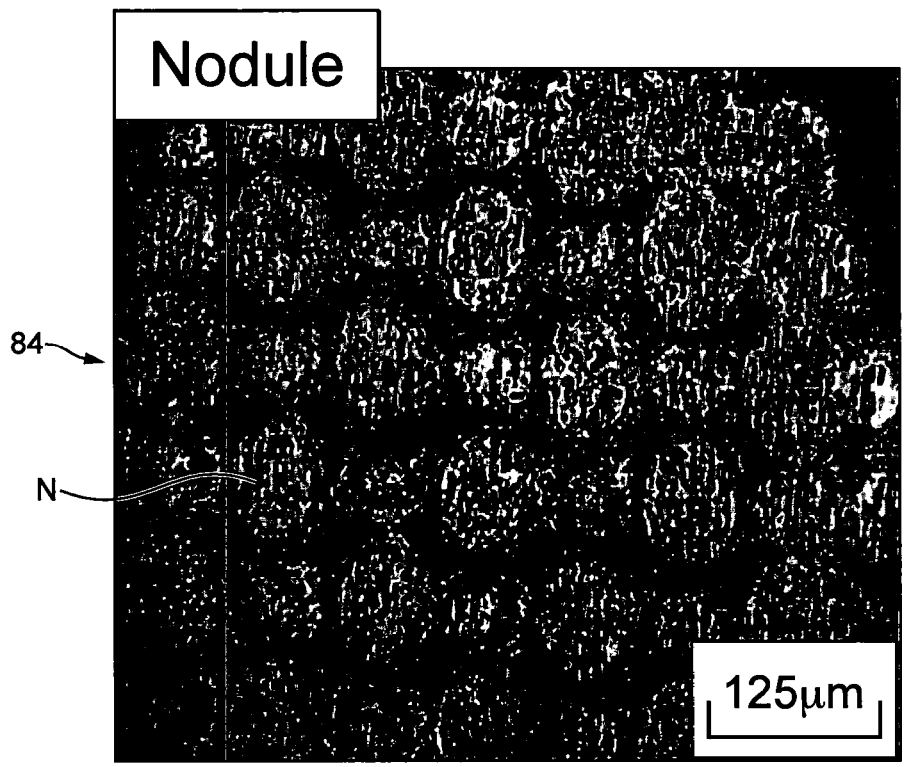
FIG. 5d is a more magnified view of a pellet showing its nodular surface structure.
Figure 5E:
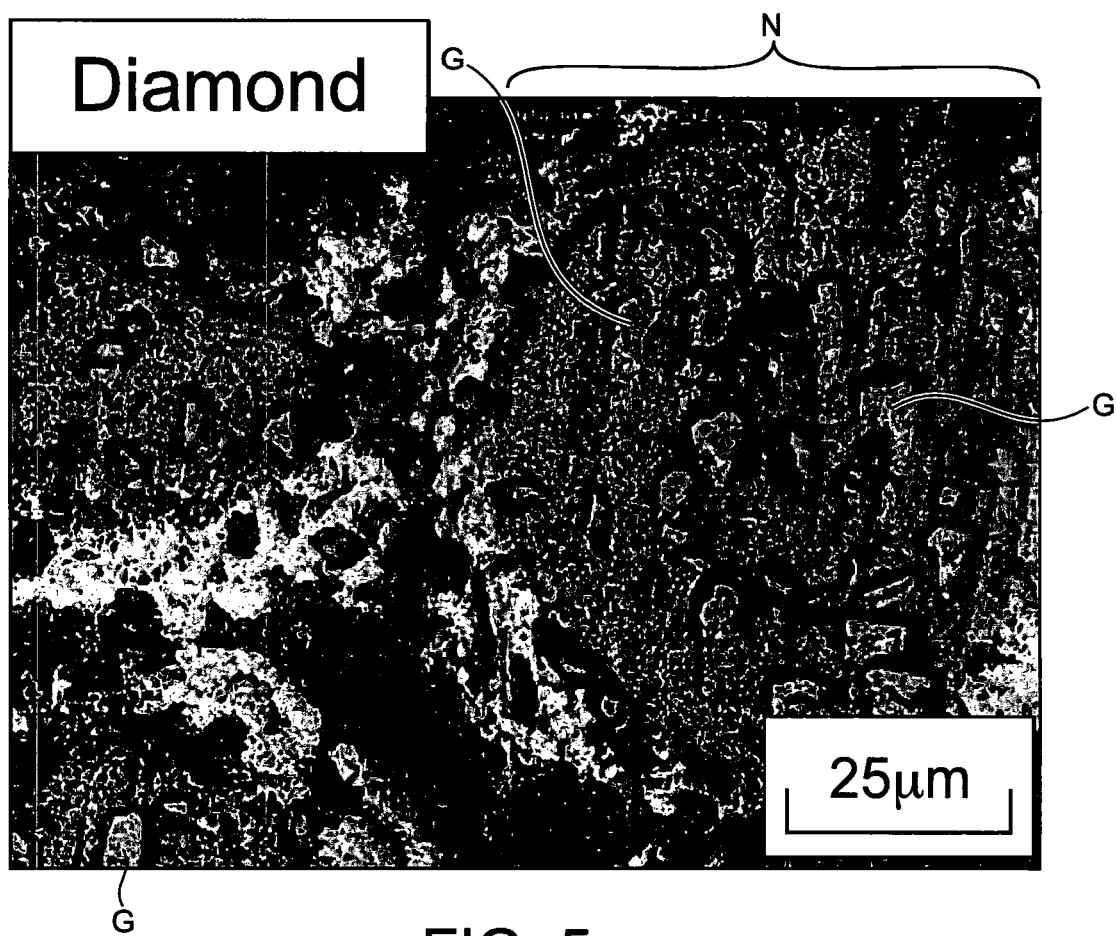
FIG. 5e is a yet more magnified view of the pellet surface showing the embedded diamond abrasives.

FIGS. 5*c* 5*d* and 5*e* are magnified views of the working surface of the larger tool of FIG. 5*a* at various magnifications, namely 5×, 20× and 100×. In FIG. 5*c*, the structure consisting of a woven metallic mesh M above which circular pellets 0.5 mm in diameter were deposited is visible. FIGS. 5*c* and 5*d* show that the surface of each pellet consists of circular nodules N of about 0.08 mm in diameter inside which the diamonds are embedded. As can be seen from FIG. 5*c*, the nodules N are arranged in rows and columns corresponding in position to the warp and weft fibres of the woven metallic mesh M. FIG. 5*e* shows a nodule N, and the diamonds G embedded in the pellet material. For this particular tool, when grinding with a contact area of 5 square millimetres, by integrating across the various snapshots, it is estimated that approximately 14,850 diamond pieces G would be in contact with the workpiece during shaping.

The pellets may be arranged in a continuous array over the entire working surface of the tool, as is seen in the tools shown in FIG. 5*a*. The larger tool shown in FIG. 5*a* has been used in a grinding operation, and in the annular zone where the tool contacted the workpiece the pellets have darkened, due to their contact with the silicon carbide workpiece.

In the tool shown in FIG. 5*b*, the pellets 84 on the tool are arranged in a discontinuous array. The part-spherical working surface of the tool has an outer annular region 88 provided with pellets, a central circular region 89 provided with pellets, and an intermediate annular region 90 where there are no pellets, situated between central circular region and the outer annular region. The annular region 90 with no pellets allows the tool to be rapidly switched from grinding to non-grinding by simply altering the precession angle between the tool rotation axis and the workpiece surface so as to move the tool contact area from the outer annular region 88 or the inner circular region 89 into the "no pellets" region 90, without lifting the tool off the workpiece. In an alternative arrangement, the pellets may be omitted from the inner circular region 89 so that tool has an annular region provided with pellets corresponding to region 88, and a central circular region with no pellets.

Examples of abrasive particles used in the pellets are diamond, cubic boron nitride (CBN), alumina and silica. Diamond particles are indicated for shaping hard ceramic materials such as silicon carbide or tungsten carbide. For shaping metals such as steel, CBN particles may be preferred, while for shaping soft materials such as glass then alumina or silica particles may be used. Other abrasive materials may be used as appropriate, for shaping particular workpiece materials. The particle size of the abrasives may be from 1 to 100 μm. Preferably, the particle size of the abrasives is from 3 to 15 μm, and a particle size of 9 μm for a diamond abrasive, held in a nickel or resin pellet matrix, has been found to be particularly effective for shaping silicon carbide.

Referring now to FIG. 5, the interior of the cup-shaped membrane 82 in this embodiment is a hollow cavity 85, and is supplied with pressurised fluid through a central opening 86 in the body 81 of the tool as is schematically indicated by the arrow F. The fluid may be compressed air or other gas, or it may be a liquid such as oil, hydraulic fluid or an aqueous liquid. The processor 9 may control the pressure of the fluid within the cavity to vary the pressure with which the pellets 84 are pressed against the workpiece while the tool 8 is in operation.

Tool Preparation

When the fabric and the abrasive-carrying pellets have been applied to the working surface of the tool, the overall outer surface defined by the exposed faces of the pellets is dressed, using a tool such as a grinding wheel, to the required part-spherical shape with its centre lying on the rotation axis H of the tool. This is preferably done with the tool mounted to the shaping machine on which it will be used, in order to ensure accurate shaping of the part-spherical surface, and accurate positioning of the surface in relation to the rotation axes A, B and H.

In order to prepare the tool for use, it is necessary to condition the working surfaces of the pellets. The conditioning cycle involves rotating the tool and pressing it against a conditioning surface, so that each part of the working surface of the tool contacts the conditioning surface for a time sufficient to wear down the working surfaces of the pellets until the surface structure of the pellets stabilises, and the rate at which material is removed from the conditioning surface becomes substantially constant. The conditioning surface is preferably a piece of silicon carbide or steel, and the tool is pressed against the conditioning surface and rotated so that the region of contact between the tool and the conditioning surface moves over the entire working surface of the tool. The conditioning operation may take up to 15 or 30 minutes, or possibly longer. The rate at which material is removed by the tool may be measured at intervals during the conditioning cycle, and the conditioning cycle may be terminated when the removal rate becomes stable.

The conditioning surface may be a substantially flat surface, or it may be shaped so as to be complementary to the working surface of the tool. When a flat conditioning surface is used, and annular region of the tool will contact the conditioning surface and by all to ring the angle of the tool axis relative to the conditioning surface, all regions of the tool can be conditioned. If a conditioning surface which is complementary to the working surface of the tool is used, then it may be possible to condition the entire working surface of the tool simultaneously. For example, in the case of a part-spherical tool, a complementary part-spherical concave conditioning surface of sufficient extent may be provided, so that the entire working surface of the tool can be in contact with the conditioning surface at the same time.

The objective of the conditioning process is to shape the diamonds so that they have a flattened exposed surface and a slightly tilted attitude, with a debris pocket at the front and binder up-stand at the back. In this context, the "front" of the diamond is its leading edge when considered in the direction it will travel across the workpiece when the tool is rotated and contacted to the workpiece. In the conditioned tool, the "nodular" form of the surface of the pellets is reduced and smoothed, and exposed abrasive particles are flattened.

During the conditioning operation, an annular region of the part-spherical tool surface is in moving contact with the conditioning surface. Measurement of the torque applied to the tool spindle to drive the tool in rotation may be used as an indication of the tangential force being applied by the tool to the conditioning surface, and the material removal rate may be determined on the basis of this force measurement. The surface condition of the tool may thus be monitored, and completion of the conditioning operation may be detected by the stabilisation of successive torque measurements. The processor 9 may provide on the display, a graphical or other representation showing measured spindle torque against each area of the working surface of the tool, so that the machine operator may monitor the progress of the conditioning operation. The processor 9 may control the movement of the tool relative to the conditioning surface on the basis of measured spindle torque, or measured tangential force, for each annular region of the tool, to ensure that all areas of the tool working surface are conditioned to substantially the same surface roughness.

Alternatively, progress of the conditioning operation may be monitored by periodically stopping the conditioning operation and examining the tool surface using a microscope or the like. In this visual techniques, a series of micrographs of a particular region of the tool surface may be taken and successive images compared to detect changes in the surface structure of the pellet. When a comparison of successive images indicates that a stable condition has been reached, the conditioning process may be concluded. The micrographs of the tool surface may be recorded as a digital images, and the comparison of successive micrographs may be effected by a processor, and when the difference between two successive micrograph images is below a predetermined threshold, the processor may signal that the conditioning process is completed, and the tool is now ready for use.

If the conditioning operation is carried out on a tool having diamond abrasives and using a steel workpiece, the conditioning time may be shortened. It is thought that this is due to a chemical reaction between the steel and the carbon atoms in the diamond.

Figure 5F:
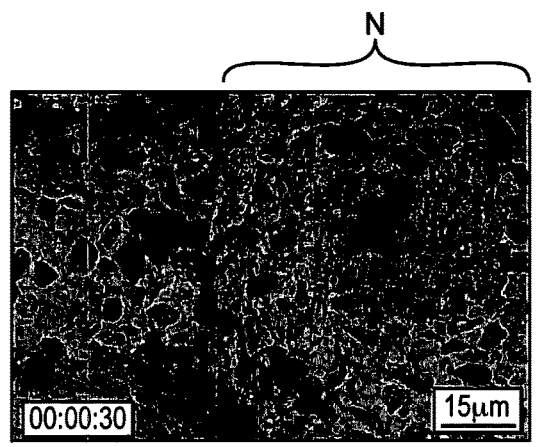
FIGS. 5f to 5k are micrographs of the surface of a tool pellet, take after it has been used in a grinding process for various times.
Figure 5G:
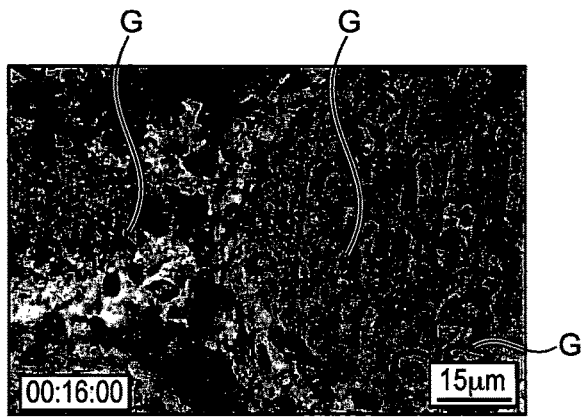
Figure 5H:
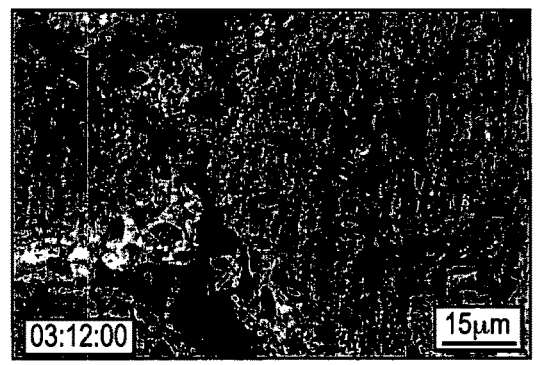
Figure 5I:
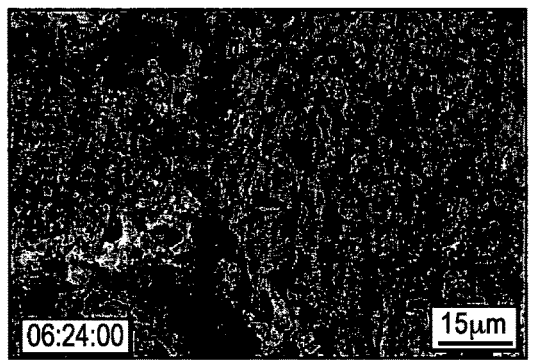
Figure 5J:
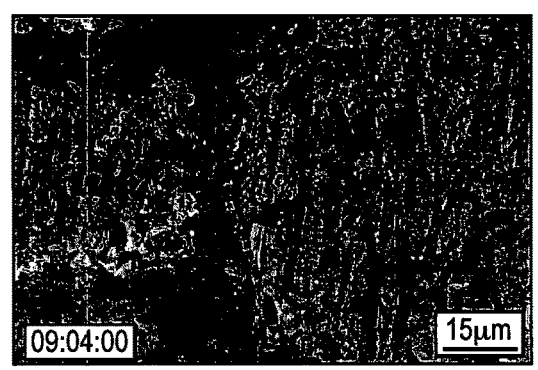
Figure 5K:

FIGS. 5f to 5k are micrographs of the surface of a tool pellet, taken after it has been used in a grinding process for various times. In FIG. 5f, the surface of the pellet is seen after 30 seconds of operation. FIG. 5g shows the surface after 16 minutes, and FIGS. 5h to 5k show the surface after three hours, six hours, nine hours and 11 hours operation respectively.

Comparing FIGS. 5f and 5g, a significant change in the surface, particularly at the right-hand side of the photograph, is seen. This change is caused by the conditioning operation, and is a smoothing of the surface of the pellet such that the shape assumed by the diamond particles allows ductile grinding to be achieved. By comparing FIGS. 5h to 5k, it can be seen that over the course of the next 11 hours the surface structure of the pellet remains substantially stable, with the diamond abrasive particles wearing very slowly. The arrows in the figures indicate three particular diamond particles, and comparing their appearance it can be seen that the exposed areas of these diamond particles remain steady, indicating very slow wear of the abrasive.

Once the tool has been conditioned, it is ready for use in a shaping operation to shape a workpiece.

Shaping Operation

In order to perform a shaping operation on a workpiece, the workpiece is mounted on the Z slide of the shaping machine. In the example shown, the workpiece is a graphite block which is first roughly shaped by a milling process, and then has a silicon carbide coating deposited on the surface to be treated. The actual surface contours of the workpiece are determined, possibly by measuring the workpiece in situ, and the actual surface contours are compared with the desired surface contours to produce a map of the workpiece surface which shows how much material is to be removed at each location.

A tool path for moving the tool over the workpiece, with required material removal amounts at each point on the tool path, is then calculated and stored in the control processor 9. The control processor 9 then controls the movement of the workpiece and tool so that the tool moves over the workpiece surface and removes the excess material, leaving the workpiece surface with the desired finish.

FIG. 6 is a schematic side view of the tool as it moves in contact with the free-form workpiece surface. The body of the tool 81 is moved toward the workpiece surface S until the pellets 84 contact the workpiece surface and the elastic 82 deforms, pressing the pellets 84 flat onto the workpiece surface S. The tool body 81 is then rotated about the spindle axis H so that the pellets 84 in an annular region of the tool contact the workpiece surface S, in a generally circular region of the workpiece surface, and move across the workpiece surface. As will be appreciated from FIG. 6, lifting the tool body 81 vertically (as seen in the Figure) will reduce the deformation of the cup 82 and decrease the diameter of the circular contact area on the workpiece surface S.

Holding the tool in the same position relative to the workpiece, and increasing the fluid pressure within the tool, results in the pellets 84 being pressed against the workpiece surface S with increased force, but does not increase the area of contact between the tool and the workpiece.

During the shaping operation, the tool is moved in translation over the workpiece surface at a controlled speed of from 10 to 1000 mm/minute, preferably about 150 mm/minute. The tool is rotated about the spindle axis H at between about 50 and 1500 rpm.

During movement of the tool over the workpiece, the contact area between tool and workpiece is varied by adjusting the distance between the surface of the workpiece and the centre of the part-spherical surface of the tool. The force with which the tool is pressed against the workpiece is controlled by controlling the fluid pressure inside the cup of the tool, and the tool rotation speed and direction of precession axis are controlled, to determine the rate at which material is removed from the workpiece at any point along the tool path.

Control of the direction of the precession axis determines the relative direction of movement of the tool to the workpiece at each point on the tool path. The control of the direction of the pellets over the surface may be effected with the objective that polishing artefacts are not left in the workpiece surface. Alternatively, the direction of movement of the pellets over the surface may be controlled such that any polishing marks left on the surface are aligned in a particular direction or directions. The speed at which the tool moves along the tool path is also controlled, to ensure that the required surface finish is achieved.

In an exemplary process, a sample of CVD SiC coated graphite was ground in two steps, using 9 μm diamond bound in nickel pellets for the first step, and 3 μm diamond bound in resin pellets second for the final grinding pass.

During the final pass, a low fluid pressure of 0.5 bar within the cup of the tool was used. The surface microtopography of the workpiece was subsequently measured, and showed low levels of micro-roughness between 0.3 and 0.5 nm Ra. Ductile grinding marks were also clearly visible on the workpiece surface, showing that ductile grinding had been achieved. An important feature of the present invention is that purely ductile mode grinding can be achieved using small diamond grain sizes, particularly grain sizes below 9 µm.

Higher fluid pressures within the cup of the tool, and smaller regions of contact between the tool and the workpiece, will result in greater rates of removal of material from the workpiece over a small area, with a decrease in the smoothness of the finished surface. Shaping the workpiece using a large contact area between the tool and the workpiece and a lower fluid pressure within the tool will result in lower removal rates of material from the workpiece but over larger areas, and will increase the smoothness of the finished surface.

For optimum results with the Shape Adaptive Grinding process, the machine parameters are adjusted so as to achieve ductile mode removal of the workpiece material. In the example above, where the workpiece surface material is SiC, then using diamond abrasives with a particle size of 9 um or smaller, and a tool provided with pellets formed from Resin or Nickel, the machine parameters may be adjusted to provide a contact area between the tool and the workpiece of from 10 to 100 mm$^2$, a pressure of about 0.5 N/mm$^2$ normal to the workpiece surface. The tool is rotated so that the abrasives move over the workpiece surface at speeds of from 20,000 to 80,000 mm/min and this rotation generates a force tangential to the workpiece surface of about 0.3 N per mm$^2$ of contact area. Water or any other suitable fluid may be used as a coolant during the grinding process, since the abrasive particles are bound to the pellets.

Both tangential and normal forces have been observed to increase linearly with the fluid pressure within the cup of the tool, while the spindle rotation speed has little or no effect on the magnitude of the tangential force. From this result, it is possible to control the grinding force and removal rate independently of each other, by a combination of fluid pressure and spindle rotation speed moderation. An increase in the fluid pressure will increase the grinding force, while an increase in the rotation speed of the spindle will increase the material removal rate.

A correlation exists between tangential forces and the Ra value of the surface roughness of the area of the workpiece surface in contact with the tool. This is thought likely to be due to increased friction between the tool and workpiece surface as the roughness becomes higher. It can thus be foreseen that real-time surface roughness assessment may be achieved during a shaping operation, by monitoring the driving torque applied to the spindle about which the tool rotates, and relaying the results to the processor 9. The processor 9 may then provide an output on the display showing the surface finish currently being achieved by the grinding process, on the basis of this torque measurement.

The specific energy of the SAG process can be calculated from these grinding force measurements.

The specific energy Kz [J/mm$^3$] is derived from the following equation:

$$Kz=(Ft \times Vs)/Q'$$

where Ft is the tangential force [N], Vs is the cutting speed [m/s], and Q' is the volumetric removal rate [mm$^3$/s].

Experiments to compare the average specific energy of the SAG process with other conventional cutting processes, for various pellet materials and diamond grit sizes have shown that the average specific energy of the SAG process is one order of magnitude higher than conventional fine grinding. This higher average specific energy indicates a reduced chip thickness during material removal, and thus correlates with the observed ductile-mode material removal from the workpiece.

Alternative Shapes of Tool

In the above described example, the tool has a part-spherical working surface. In other embodiments, the tool may have a working surface in the form of a rotating ball with the pelleted fabric covering the surface of the ball. In a yet further alternative, the pelleted fabric may be in the form of a belt running over a spherical pulley, with the pulley being used to urge the belt into contact with the workpiece surface. In yet a further alternative, the pelleted fabric may be attached to a disc, either the circumferential cylindrical edge of the desk or to a face of the disc.

In all of the above examples, the surface pressing the pelleted fabric against the workpiece will be a deformable surface so that the pelleted fabric may, over an area of contact between the fabric of the workpiece, conform to the shape of the workpiece.

In the above-described example, the tool is inflatable with fluid pressure to vary the force applied between the pellets and the workpiece. As an alternative to fluid pressure, the centre of the tool may be formed from an elastic material such as natural or synthetic rubber, or resilient plastics. The elastic material may be solid, or may have a foamed structure. Such a solid or foamed core preferably has a hardness of between 30 and 60 on the Shore A scale. While this will prevent active control over the internal pressure within the tool, there will be a correlation between the force with which the pellets are pressed onto the workpiece and the amount of deformation applied to the tool by pressing it against the workpiece. For a tool with a part-spherical working surface and a core of elastic material, the force with which the pellets are urged against the workpiece will then be a function of the area of contact between the pelleted cloth and the workpiece. In a further alternative embodiment, the centre of the tool may be formed from a resilient material with an open-cell foam structure, and a controllable supply of pressurised fluid in communication with the open-cell structure may be used to vary the internal pressure of the tool. If no fluid pressure is applied, the tool will perform as if it simply had a solid elastic centre.

In a further alternative embodiment for the tool structure, the membrane 82 and the flexible fabric layer 83 may at least partially define an internal cavity of the tool, and the cavity may be filled with a non-Newtonian fluid whose viscosity varies in response to the application of shear forces in the fluid. Generally, the viscosity will increase when the fluid is subjected to high shearing forces, such as occur when a body of the fluid is rapidly deformed. By providing a tool whose flexible surface at least partially defines a cavity filled with such a fluid, the flexible surface of the tool will strongly resist sudden changes in shape of the tool, but can accommodate slow changes in shape. One such non-Newtonian fluid material is referred to in common parlance as "silly putty", and is typically composed of about 65% dimethyl siloxane (hydroxy-terminated polymers with boric acid), about 17% silica (crystalline quartz), about 9% Thixatrol ST (castor oil derivative), about 4% polydimethylsiloxane, about 1% decamethyl cyclopentasiloxane, about 1% glycerine, and about 1% titanium dioxide. Another example of such a material is a starch solution made up with a minimum amount of water.

By observing pellets under a microscope at various stages of the tool life, it was possible to determine that the number and shape of the abrasive particles remains stable for over 10 hours of grinding. A negative average rake angle was observed in the diamond abrasive particles, which explains the longevity of the cutting edge and fine ductile regime associated with this grinding process.

Measurement of the grinding forces used in the SAG process has revealed that it is possible to control grinding forces and removal rate independently of each other by a combination of air pressure and spindle rotation speed control. A correlation between tangential forces and surface roughness was also established, which suggests that real-time surface condition assessment is possible by monitoring the work spindle torque. Surface microroughness between 0.3 and 0.5 nm Ra can be achieved with this process. During grinding of a workpiece using the SAG process, the torque applied to the work spindle to maintain the desired rate of revolution of the tool is measured and monitored for various locations on the workpiece surface. The measured torque is compared to a preset reference value by the processor 9 controlling the operation, and when the torque falls to or below the reference value the processor can give an indication that the required surface roughness has been reached. The processor may give an indication that the required surface roughness has been reached when the torque falls to the predetermined value for all positions of the tool on the workpiece surface. Alternatively the, the indication may be given when the torque has fallen to the predetermined value at one or more predefined positions on the workpiece surface. The preset reference value may be input to the processor, and may change depending on the properties of the tool and the material of the workpiece surface.

Figure 7:
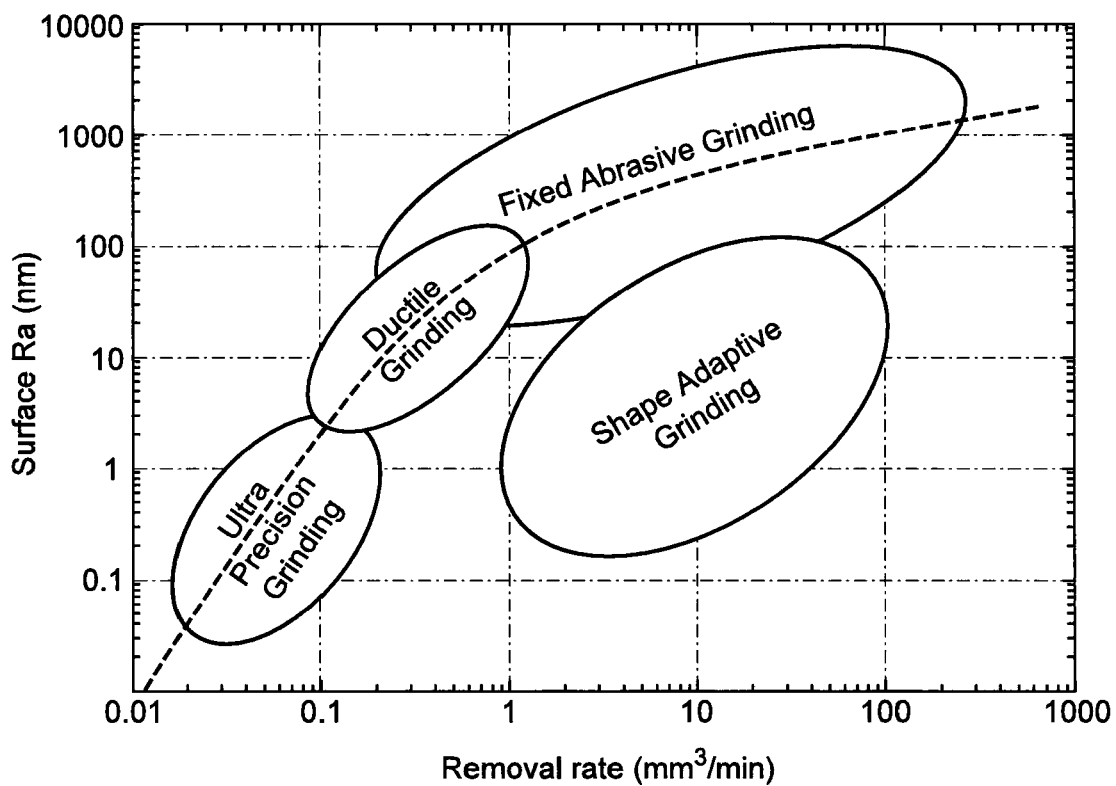
FIG. 7 is a diagram illustrating the relationship between material removal rates and surface finish for various grinding processes.

FIG. 7 is a diagram illustrating the relationship between material removal rates and surface finish for various grinding processes. While it is possible using conventional ultra-precision grinding to obtain a surface finish of less than 0.1 nm Ra, it will be seen from the diagram that this is done at very low material removal rates, so that these grinding operations take a long time to remove material from the workpiece. The conventional fixed abrasive grinding using a grinding wheel can achieve very high removal rates of up to 500 mm$^3$/min, but at these removal rates the achievable surface roughness is in excess of 1000 nm Ra. Using the SAG process, a surface finish having a roughness of 1 Ra or less is achievable with significant removal rates of between one and about 50 mm$^3$/min. By using the SAG technique, a workpiece requiring a smooth surface finish can be produced rapidly, since the technique allows material to be removed from the workpiece surface quickly without disadvantage to the finish.

Figure 8:
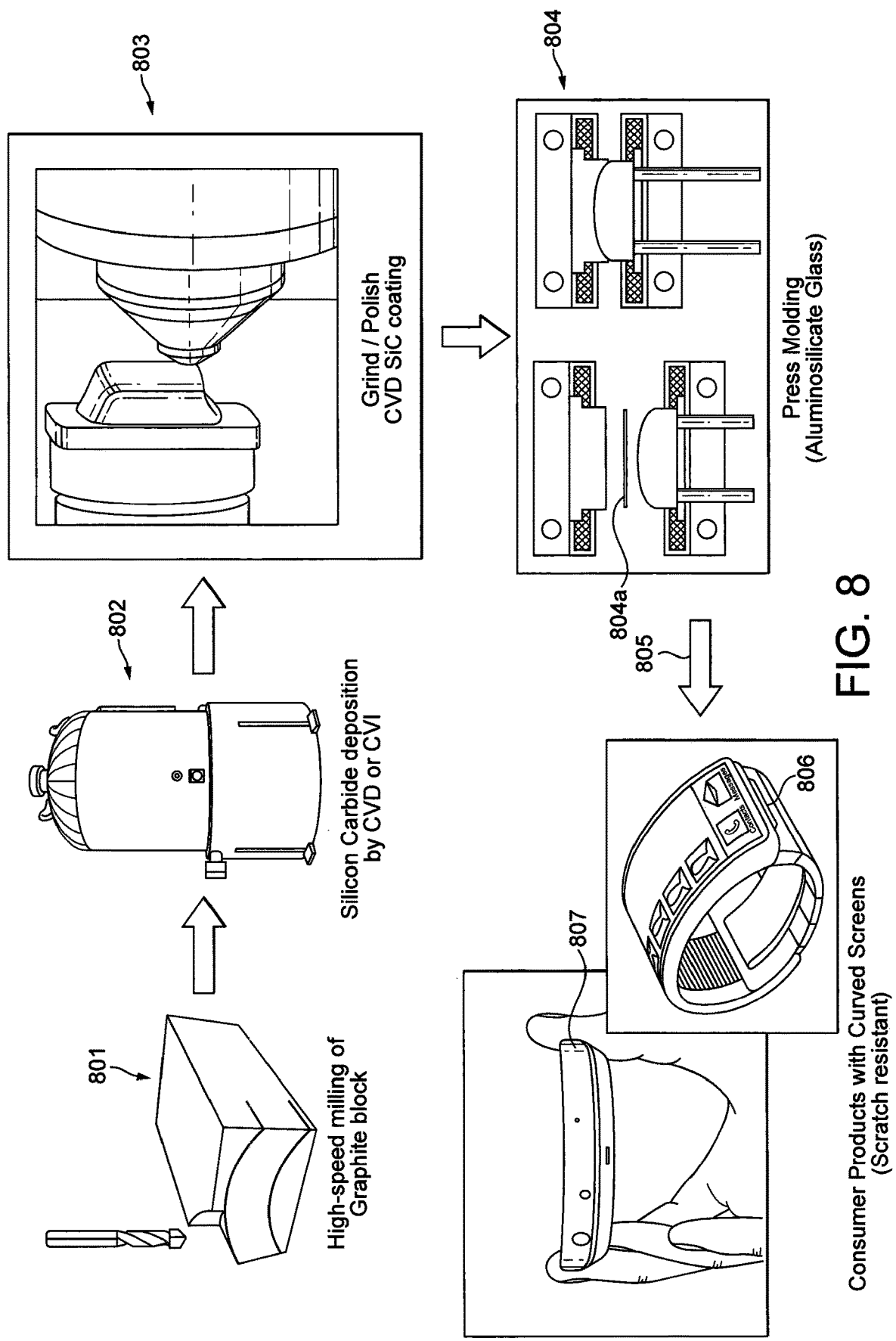
FIG. 8 is a series of diagrams showing the stages in the production of mould parts and curved-screen products, using the shaping process of the invention

FIG. 8 is a series of diagrams showing the stages in the production of mould parts and curved-screen products, using the shaping process of the invention. In step 801, the first stage of the process, a graphite block is machined using conventional techniques to bring it roughly to the shape of a mould component for a curved glass display screen. In step 802, a layer of silicon carbide is deposited on the surface of the shaped graphite block which will form the mould surface. In step 803, the SAG process is used to grind and polish the silicon carbide coating to the required surface finish to form one mould part which is co-operable with a second mould part to form a mould cavity in which glass can be moulded using to produce a glass component with a smooth surface. In step 804, a sheet of glass 804*a* which has been softened by heating is placed between two mould components which are then brought together to form the glass into the shape of the mould cavity. In this example the mould parts are brought together to form the sheet into a curved glass component. When the glass has cooled sufficiently, the curved glass component is removed from the mould. The curved glass component is then incorporated, in a final manufacturing process, into a display screen or other product such as a lens, a wearable computer display 806, a mobile telephone 807 or the like.

The invention claimed is:

1. A machine for shaping and finishing a workpiece surface, the machine including:
   a tool, comprising:
      a flexible support surface;
      a plurality of rigid pellets mounted to the flexible support surface and carrying abrasive material, each pellet having a surface facing away from the flexible support surface, the said surfaces of the rigid pellets forming a part-spherical or cylindrical working surface of the tool; and
      a mount onto which said flexible support surface is mounted;
   actuator means for moving said tool relative to said surface of said workpiece; and
   control means for automatically controlling said actuator means to form an area of contact between the working surface of the tool and the surface of said workpiece, and to move said area of contact relative to the surface of said workpiece.

2. A machine according to claim 1, wherein the actuator means includes means for rotating said tool about an axis such that individual pellets forming the working surface of the tool move across said area of contact.

3. A machine according to claim 1, wherein the flexible support surface of the tool is cup-shaped.

4. A machine according to claim 3 wherein the flexible support surface of the tool defines a hollow internal cavity, and the machine further includes means to supply a pressurised fluid to the said internal cavity.

5. A machine according to claim 4 wherein the machine further includes control means to control the pressure of fluid within the said internal cavity.

6. A machine according to claim 1, wherein the actuator means is operable to move the tool over the workpiece to perform a ductile grinding operation.

7. A tool for a shaping machine, the tool comprising a flexible support surface having a plurality of substantially rigid pellets attached thereto and carrying abrasive material, and wherein surfaces of the pellets which face away from the support surface form a part-spherical or cylindrical working surface of the tool.

8. A tool according to claim 7, wherein the flexible support surface of the tool is cup-shaped.

9. A tool according to claim 7, wherein the rigid pellets are formed from metallic material.

10. A tool according to claim 9, wherein the rigid pellets are formed from nickel.

11. A tool according to claim 7, wherein the rigid pellets are formed from resin material.

12. A tool according to claim 7, wherein the abrasive material carried by the rigid pellets is selected from diamond, cubic boron nitride (CBN), alumina and silica.

13. A tool according to claim 12, wherein the abrasive material has a particle size of from 1 to 100 μm.

14. A method of shaping a workpiece using the tool of claim 7, comprising the steps of:
- determining a path to be travelled by the tool across the workpiece;
- determining tool speed, the pressure and effective area of contact of the tool on the workpiece in order to achieve ductile-mode material removal; and
- driving the tool over that path while dynamically varying tool speed, the said applied pressure and effective contact area so as to effect a ductile grinding process to remove material from the workpiece.

15. A method according to claim 14, wherein the area of contact between the tool and the workpiece is between 10 and 100 mm$^2$ and is moved across the workpiece at from 50 to 500 mm/minute.

16. A method according to claim 14, further including a conditioning step of driving the tool in contact with a conditioning surface for a predetermined period before carrying out the shaping process.

17. A method according to claim 16, wherein the conditioning step is carried out until the rate of material removal from the conditioning surface is substantially constant.

18. A method according to claim 16, wherein the conditioning step is carried out until the working surface of the tool reaches a substantially steady state.

19. A method according to claim 16, wherein during the conditioning process a driving force applied to the tool is monitored, and the conditioning process is continued until the monitored driving force reaches a steady value.

20. A method according to claim 16, wherein the conditioning surface is a surface formed from silicon carbide or steel.

21. A workpiece produced by the shaping method of claim 14.

22. A workpiece according to claim 21 which is a mould cavity component.

23. A method of producing a curved glass component using a mould shaped using the method of the invention, comprising the steps of:
- machining a blank of material to the approximate form of a mould component;
- shaping the mould component using the method of claim 14, to form a mould component having a polished and curved cavity surface;
- softening a sheet of glass to a ductile state;
- pressing the softened glass sheet into the mould component to shape the glass into the curved form of the cavity surface; and
- removing the curved glass component from the mould.

24. A method of producing a curved display screen, comprising performing the steps of claim 23 and the additional step of manufacturing a lens or display screen using the curved glass component.

25. A tool according to claim 7, wherein the abrasive material particles (G) are shaped so as to have a flattened exposed surface and a slightly tilted attitude, with a debris pocket at the front and a binder up-stand at the back.

26. A tool according to claim 7, wherein the part-spherical working surface of the tool has an annular region provided with pellets, and a central circular region with no pellets.

27. A tool according to claim 7, wherein the part-spherical working surface of the tool has an outer annular region provided with pellets, a central circular region provided with pellets, and an intermediate annular region where there are no pellets, situated between central circular region and the outer annular region.

28. A method of manufacturing a tool according to claim 7, comprising the step of treating the working surface of the tool to a conditioning step comprising driving the tool in contact with a conditioning surface, wherein during the conditioning process a driving force applied to the tool is monitored, and the conditioning process is continued until the monitored driving force reaches a steady value.

29. A method according to claim 28, wherein the conditioning surface is a surface formed from silicon carbide or steel.

30. A tool according to claim 10, wherein the flexible support surface of the tool comprises a textile fabric at least partially formed by metallic threads, and the rigid pellets are formed from metallic material, and wherein the rigid pellets are formed on the textile fabric by electroplating.

* * * * *